United States Patent [19]

Pozella et al.

[11] 3,833,101
[45] Sept. 3, 1974

[54] TYPEWRITER MOTOR CLUTCH

[75] Inventors: William Pozella; Henry D. Chaplin, Jr., both of Cortland, N.Y.

[73] Assignee: SCM Corporation, New York, N.Y.

[22] Filed: Feb. 8, 1973

[21] Appl. No.: 330,554

[52] U.S. Cl. ..................... 192/105 CF, 192/107 M
[51] Int. Cl. ......................................... F16d 43/284
[58] Field of Search ... 192/105 CF, 103 B, 105 CD, 192/71, 79, 105; 73/535, 546, 547

[56] References Cited
UNITED STATES PATENTS

| | | | |
|---|---|---|---|
| 2,323,353 | 7/1943 | Polg | 192/103 B |
| 2,945,101 | 7/1960 | Chichester et al. | 73/547 |
| 3,228,498 | 1/1966 | Zahradnik | 192/105 CF |
| 3,461,746 | 8/1969 | Schwerdhofer | 192/103 B |
| 3,498,140 | 3/1970 | Porquet et al. | 73/546 |
| 3,625,326 | 12/1971 | Rix et al. | 192/105 CF |
| 3,693,771 | 9/1972 | DeLancey | 192/103 B |
| 3,699,288 | 11/1972 | Swoveland et al. | 73/535 |

FOREIGN PATENTS OR APPLICATIONS

| | | | |
|---|---|---|---|
| 883,392 | 6/1953 | Germany | 192/105 CF |

*Primary Examiner*—Benjamin W. Wyche
*Assistant Examiner*—Allan Russell Burke
*Attorney, Agent, or Firm*—John A. Taylor

[57] ABSTRACT

Posts are formed integrally with a plastic disk for a pivotally mounting centrifugal weights on the face of the disk. The posts have flanges on their free ends and slots in their free ends for snap retaining the centrifugal weights on the posts. The centrifugal weights are each formed integrally in one piece and have clutch dogs as thick as the centrifugal weights. For engagement with the clutch dogs, at least one tooth at least as thick as the clutch dogs is formed on a sleeve. The sleeve is connected to a pulley and both are composed of glass reinforced nylon.

2 Claims, 5 Drawing Figures

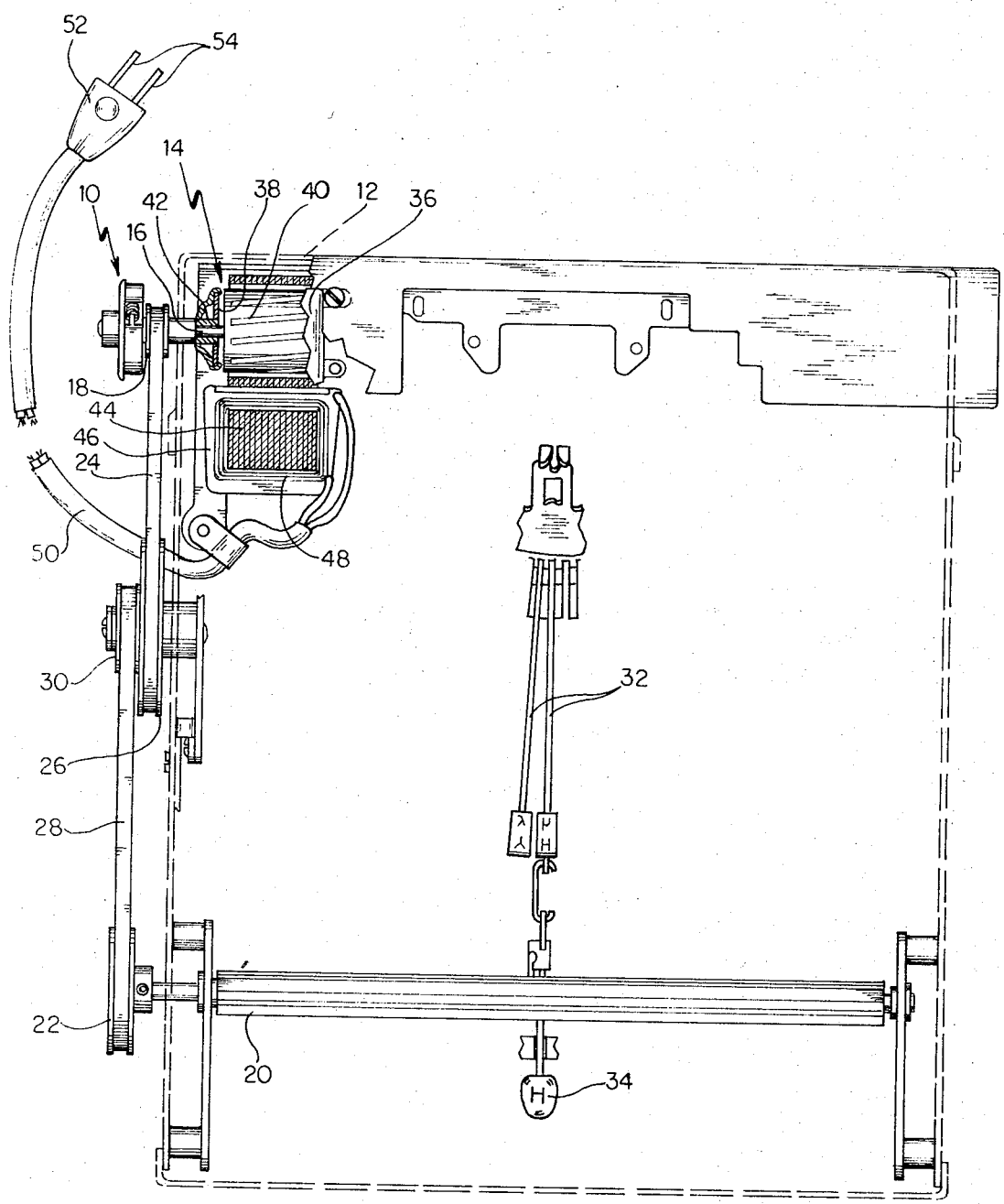

PATENTED SEP 3 1974
3,833,101
SHEET 2 OF 2
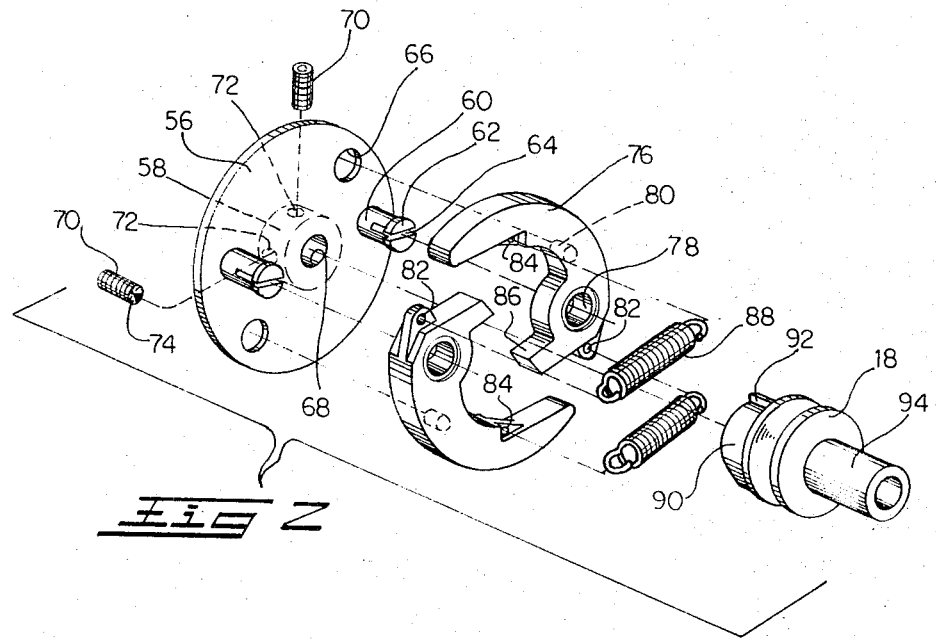
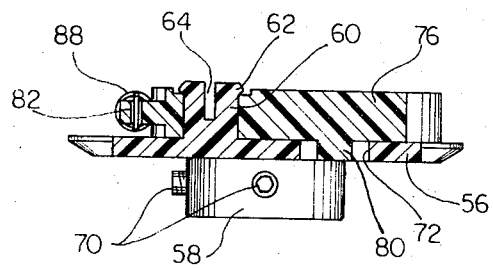
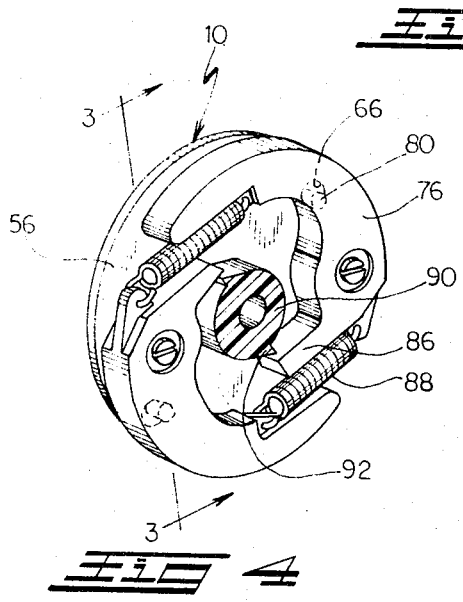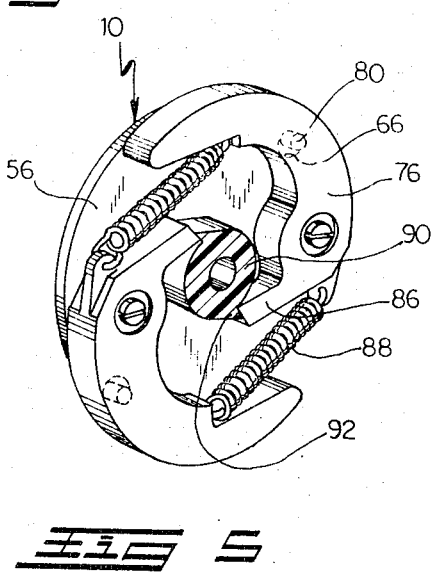

3,833,101

TYPEWRITER MOTOR CLUTCH

BACKGROUND OF THE INVENTION

1. Field of the Invention

This invention relates to typewriter motor clutches and more particularly to an improved motor clutch for an electric typewriter.

2. Description of the Prior Art

Prior typewriter motor clutches having centrifugal weights mounted on a disk as disclosed in the U.S. Pat. No. Re 25,024, dated Aug. 15, 1961, to Joseph P. Barkdoll have numerous disadvantages. They have been relatively hard to manufacture because of the large number of parts. The operating parts of the clutch have to be case hardened, and if the centrifugal weights are riveted too tightly on the disk, the entire assembly has to be thrown away. They transmit current from the motor to the frame of the typewriter during high voltage tests. Any lubrication that is applied poses a hazard to the motor. In addition, the clutches tend to be poorly balanced and are too heavy for really quick reaction.

SUMMARY OF THE INVENTION

It is, therefore, a primary object of the invention to provide an improved typewriter motor clutch that costs much less than prior clutches.

Another object of the invention is to provide an improved typewriter motor clutch that is much easier to form, has less parts, is much easier to assemble, and is much easier to disassemble than prior clutches.

Another object of the invention is to provide an improved typewriter motor clutch that will not conduct electricity from the motor.

Another object of the invention is to provide an improved typewriter motor clutch that requires no lubrication.

Another object of the invention is to provide an improved typewriter motor clutch that is much better balanced and weighs less than prior clutches.

In order to accomplish the objects of the invention, many parts are formed integrally using different structures, processes, and materials than are used in prior typewriter motor clutches. A disk and pivotal mountings for centrifugal weights are molded in one piece using a plastic. If the centrifugal weights do not pivot correctly, they can easily be salvaged without throwing away the entire assembly. The centrifugal weights themselves are each cast in one piece using a zinc alloy, and a sleeve and pulley are molded using a nonconducting material such as 40 percent glass reinforced nylon. In order to distribute the clutch force over a large area, the clutch dogs on the centrifugal weights are as thick as the centrifugal weights and teeth on the sleeve are as thick as the clutch dogs. The case hardening process of prior clutches is eliminated. The clutch requires no lubrication and is better balanced and lighter than prior clutches.

Other objects and a fuller understanding of the invention can be had by referring to the description and claims taken in conjunction with the accompanying drawings.

BRIEF DESCRIPTION OF THE DRAWINGS

FIG. 1 is a schematic top plan view of the relevant portions of an electric typewriter incorporating the invention.

FIG. 2 is an exploded perspective view of a typewriter motor clutch incorporating the invention.

FIG. 3 is a section view taken substantially along the line 3—3 in FIG. 4 with the clutch assembled.

FIG. 4 is a perspective view of the typewriter motor clutch in a disengaged position with the pulley omitted for clarity.

FIG. 5 is a view similar to FIG. 4 of the typewriter motor clutch in an engaged position.

DESCRIPTION OF THE PREFERRED EMBODIMENT

With reference to FIG. 1, a typewriter motor clutch 10 incorporating the invention is shown mounted in an electric typewriter. Only the portions of the typewriter that are most relevant to describe the invention are shown.

The typewriter includes a frame 12 and an electric motor 14 mounted in the left rear corner of the frame. The motor has a rotor shaft 16 on which the clutch is mounted. The clutch includes a pulley 18 which rotates with the rotor shaft when the clutch is engaged.

Journaled in the front of the frame is a power roll 20 with a pulley 22 on its left end. The power roll is driven by a primary V-belt 24 from the clutch pulley to a large variable diameter pulley 26 and a secondary V-belt 28 from a small variable diameter pulley 30 to the power roll pulley. The variable diameter pulleys operate in the manner described in the U.S. Pat. No. Re 25,024, dated Aug. 15, 1961, to Joseph P. Barkdoll. The power roll operates type bars 32 through intermediate mechanisms which are not shown. The particular type bar to be actuated is selected by pressing a key 34 which is shown for orientation purposes.

The motor is a small squirrel cage induction motor which is insulated from the frame 12 of the typewriter by a mounting bracket 36 composed of an electrically insulating material. The motor includes a frame 38 and a rotor 40 mounted on the rotor shaft. The rotor shaft is journaled in two bearings 42 in the frame of the motor of which only one bearing is shown.

Surrounding the rotor is a stator 44. The stator includes a bobbin 46 composed of an electrically insulating material and containing windings 48 for the stator. The windings can be connected to a power source by a power cord 50 having a plug 52 on its free end. The plug has two prongs 54 for insertion into a common alternating current outlet.

Turning to FIGS. 2 and 3, the typewriter motor clutch includes a disk 56 having a hub 58 on one face and two posts 60 projecting from the other face. Each post has a flange 62 on its free end and a slot 64 in its free end. There are two stop holes 66 in the face of the disk, and an axial hole 68 for the rotor shaft through the center of the disk and hub. The disk is connected to the rotor shaft by two setscrews 70 that are threaded into two radial holes 72 that are 90° apart in the hub. Each setscrew has a conical hollow portion 74 in its interior end to increase its holding power. The disk, hub, posts, and flanges are molded integrally in one piece using a plastic such as forty percent glass reinforced nylon.

Two centrifugal weights 76, each having a lateral hole 78, are pivotally mounted on the posts 60 on the disks by squeezing the flanges 62 on the free ends of the posts inward so that the flanges will clear the holes 78 in the centrifugal weights. The slots 64 in the free ends of the posts enable the flanges to be squeezed inward. Once the centrifugal weights are on the posts, the flanges are free to snap outward again to retain the centrifugal weights on the posts. Each centrifugal weight has a pin 80 that projects into one of the stop holes 66 in the disk to limit the pivotal movement of the centrifugal weight.

Each centrifugal weight also has a spring hole 82 or 84 near each end and a clutch dog 86 on one end. Small coil springs 88 between opposite spring holes 82 and 84 bias the clutch dogs outward into their disengaged positions. The clutch dogs present wide clutching surfaces because they are as thick as the centrifugal weights. Each centrifugal weight and pin 80 are cast integrally in one piece using a zinc alloy such as ASTM AG40A, which is also designated as SAE 903.

A sleeve 90 having diametrically opposed teeth 92 for engagement with the clutch dogs 86 on the centrifugal weights is formed integrally with the pulley 18 and a spacer sleeve 94 from an electrically insulating material such as forty percent glass reinforced nylon. The teeth on the sleeve are thicker than the clutch dogs in order to present wide clutching surfaces to reduce wear and in order for the pulley to clear the clutch dogs. The forty percent glass reinforced nylon is especially resistant to belt wear of the pulley 18.

In operation, the clutch operates as shown in FIGS. 4 and 5. Upon starting, the motor rotates the disk 56 and centrifugal weights in a clockwise direction with the clutch dogs 86 disengaged from the teeth 92 on the sleeve until the motor reaches a clutching speed. At that time, centrifugal force pulls the long ends of the centrifugal weights outward against the pull of the small coil springs. When the long ends of the centrifugal weights move outward, the clutch dogs on the other ends move inward to engage the teeth on the sleeve to rotate the sleeve and pulley 94 with the disk. The actions of the stop holes 66 in the disk on the pins 80 on the centrifugal weights limit the outward movement of the long ends of the centrifugal weights and hence the inward movement of the clutch dogs so that the clutch dogs do not scrape against the circumference of the sleeve between the teeth. When the motor drops below the clutching speed, the clutch dogs disengage in a reverse fashion. The stop holes also limit the outward movement of the clutch dogs so that the coil springs are not pinched between the centrifugal weights.

With reference to FIG. 1, precise operation of the clutch is important to the feasibility of an electric typewriter for two reasons. First, the clutch delays the connection of the motor to the power roll 20 until the motor can get up enough speed to drive the power roll without stalling. Second, if two or more type bars 32 should become jammed while typing, the motor will become quickly disengaged from the power roll to prevent the motor from burning out. In fact, the shock from the sudden disengagement of the clutch causes the V-belts to reverse the rotation of the power roll momentarily to relieve the pressure on the type bars so that the type bars can be easily freed by the operator. The motor quickly regains clutching speed again and immediately disengages again if the type bars are still jammed. The clutch alternately engages and disengages as long as the type bars remain jammed and the alternate engagement and disengagement along with the momentary reversals of the power roll upon disengagement often frees the type bars even without intervention of the operator.

The typewriter motor clutch embodying the invention costs less than half as much as prior clutches. There is only one assembly and there are only eight parts: a disk 56, two setscrews 70, two centrifugal weights, two coil springs, and an integral sleeve-pulley. In assembly, if the centrifugal weights do not pivot correctly on the posts 60 on the disk, the centrifugal weights are riveted on the disk and the entire assembly has to be thrown away. Because of the large clutching surface afforded by the thick clutch dogs 86 and teeth 92, the interaction of the zinc alloy clutch dogs with the glass reinforced nylon teeth results in very little wear of either part. In prior clutches, which are composed of steel, the clutch dogs and teeth have to be precisely case hardened.

In order to satisfy the Underwriters Laboratories standards for double insulation, various high voltage tests are employed per UL Bulletin 114. In one such test, 2,500 volts are connected across the stator 44 of the motor and the frame 12 of the typewriter. Using prior clutches, which are composed of steel, current travels from the stator, to the rotor shaft bearings 42, to the rotor shaft, to the clutch pulley 18, through the primary V-belt 24, to the large variable diameter pulley 26, and then to the frame 12 of the typewriter. Although one would not normally think of V-belts as being electrically conducting, they do conduct when high voltages are employed. It is believed that carbon black in the rubber forms a path for the current. All attempts to compose an electrically insulating V-belt that also satisfies the rigorous requirements for the primary V-belt 24 have failed. Thus, although the motor is insulated from the frame of the typewriter by its mounting bracket 36 which is composed of an electrically insulating material, prior clutches form part of another path for current to the frame of the typewriter to create a shock hazard. The pulley of the clutch incorporating the invention is composed of an electrically insulating material, thus enabling the typewriter to satisfy the Underwirters Laboratories standards for double insulation. The electrically insulating material also requires no lubrication. Because of the nearness of the clutch to the motor, any lubrication could damage the motor. In addition, the clutch incorporating the invention is much better balanced and weighs less than prior clutches making it quicker acting.

Although the invention has been described in its preferred form with a certain degree of particularity, it is understood that the present disclosure of the preferred form has been made by way of example and that numerous changes in the details of construction and the combination and arrangement of parts can be resorted to without parting from the spirit and the scope of the invention.

Having thus set forth the nature of the invention, what is claimed is:

1. An improved typewriter motor clutch including a disk, centrifugal weights, clutch dogs on the centrifugal weights, posts pivotally mounting the centrifugal weights on the face of the disk, a sleeve having at least one tooth for engagement with the clutch dogs on the centrifugal weights, and drive transmitting means connected to the sleeve, wherein the improvement comprises flanges formed integrally on the free ends of the posts for retaining the centrifugal weights on the posts, the posts having slots in their free ends so that the flanges can be squeezed radially inward for assembling the centrifugal weights on the posts, and the disk, posts, and flanges integrally composed of a plastic.

2. The typewriter motor clutch of claim 1, in which the sleeve, tooth, and drive transmitting means are composed of at least 30 percent glass reinforced nylon.

* * * * *